US012155417B2

(12) United States Patent
Shibata et al.

(10) Patent No.: US 12,155,417 B2
(45) Date of Patent: Nov. 26, 2024

(54) OPTICAL TRANSMISSION DEVICE, OPTICAL COMMUNICATION SYSTEM, AND OPTICAL COMMUNICATION METHOD

(71) Applicant: NIPPON TELEGRAPH AND TELEPHONE CORPORATION, Tokyo (JP)

(72) Inventors: Naotaka Shibata, Musashino (JP); Hirotaka Ujikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 136 days.

(21) Appl. No.: 17/913,388

(22) PCT Filed: Mar. 27, 2020

(86) PCT No.: PCT/JP2020/014281
§ 371 (c)(1),
(2) Date: Sep. 21, 2022

(87) PCT Pub. No.: WO2021/192294
PCT Pub. Date: Sep. 30, 2021

(65) Prior Publication Data
US 2023/0140715 A1 May 4, 2023

(51) Int. Cl.
*H04B 10/27* (2013.01)
*H04B 10/40* (2013.01)
(Continued)

(52) U.S. Cl.
CPC ............ *H04B 10/27* (2013.01); *H04B 10/29* (2013.01); *H04B 10/40* (2013.01); *H04B 10/43* (2013.01); *H04B 10/50* (2013.01); *H04B 10/60* (2013.01)

(58) Field of Classification Search
None
See application file for complete search history.

(56) References Cited

U.S. PATENT DOCUMENTS

2003/0226149 A1* 12/2003 Chun ................. H04L 12/2803
 348/E7.071
2007/0092256 A1* 4/2007 Nozue ................ H04J 14/0246
 398/72
(Continued)

FOREIGN PATENT DOCUMENTS

| JP | 200013424 A | 1/2000 |
|----|-------------|--------|
| JP | 2011130000 A | 6/2011 |

OTHER PUBLICATIONS

ITU-T G.984.3 : Gigabit-capable Passive Optical Networks (G-PON): Transmission convergence layer specification, (Mar. 2008), International Telecommunication Union, Telecommunication Standardization Section or ITU, 146 pages (Year: 2008).*

(Continued)

*Primary Examiner* — Darren E Wolf
(74) *Attorney, Agent, or Firm* — Harness, Dickey & Pierce, P.L.C.

(57) ABSTRACT

An optical transmission device which performs relaying between a terminal device and a server via an optical network device, the terminal device and the server establishing connection with each other, includes a request detection unit which detects a connection establishment request transmitted to the server by the optical network device on the basis of a connection establishment request transmitted to the server by the terminal device, a response detection unit which detects an acknowledgment transmitted to the terminal device by the server on the basis of the connection establishment request detected by the request detection unit, and a band allocation unit which, if the response detection unit detects the acknowledgment, performs allocation so as (Continued)

to expand a band over which the optical network device is capable of transmission to the server, regardless of presence or absence of a buffer amount notification to be transmitted by the optical network device.

8 Claims, 6 Drawing Sheets

(51) Int. Cl.
*H04B 10/43* (2013.01)
*H04B 10/50* (2013.01)
*H04B 10/60* (2013.01)
H04B 10/29 (2013.01)

(56) References Cited

U.S. PATENT DOCUMENTS

| | | | | |
|---|---|---|---|---|
| 2012/0008937 | A1* | 1/2012 | Cheng | H04B 10/272 |
| | | | | 398/1 |
| 2012/0144445 | A1* | 6/2012 | Bonta | H04L 65/756 |
| | | | | 725/116 |

OTHER PUBLICATIONS

Takafumi Takeshita et al., Mastering TCP / IP Primer 5th Edition, Ohmsha, Ltd., Feb. 25, 2012, pp. 230-256.

\* cited by examiner

OPTICAL TRANSMISSION DEVICE, OPTICAL COMMUNICATION SYSTEM, AND OPTICAL COMMUNICATION METHOD

CROSS-REFERENCE TO RELATED APPLICATIONS

This application is a 371 U.S. National Phase of International Application No. PCT/JP2020/014281, filed on Mar. 27, 2020. The entire disclosure of the above application is incorporated herein by reference.

TECHNICAL FIELD

The present invention relates to an optical transmission device, an optical communication system, and an optical communication method.

BACKGROUND ART

As a technology for providing a FTTH (Fiber To The Home) service at high speed and at a low price, there is, for example, a PON (Passive Optical Network) technology. A PON is an optical communication system constructs a network without photoelectric conversion by branching an optical signal using a splitter as a passive element.

Some of optical communication systems, such as a PON, establish connection by using TCP (Transmission Control Protocol) and implement highly reliable communication between a terminal device (client) and a server.

Examples of a terminal device used in the above-described optical communication system include an information processing device having a wired or wireless communication function, such as a PC (personal computer). For example, the terminal device communicates with a content server or the like which provides content via an ONU (Optical Network Unit), a splitter, and an optical transmission device, such as an OTL (Optical Line Terminal).

CITATION LIST

Non-Patent Literature

Non-Patent Literature 1: Takeshita, Takafumi and three others, "masutaringu TCP/IP nyumon hen" (mastering TCP/IP: elementary level), 5th ed., Ohmsha, Ltd., Feb. 25, 2012, p. 230-256

SUMMARY OF THE INVENTION

Technical Problem

For example, in TCP communication, an algorithm called slow start is used at the start of communication in order to prevent a client, such as a terminal device, from transmitting massive data to a server from the beginning to cause an excess over the capacity of a network.

Slow start has parameters, such as a congestion window (CW) and a slow start threshold (SST).

The amount of data to be transmitted by a terminal device depends on a CW. For the terminal device, an initial value for the CW is set to be small. Upon receipt of a positive acknowledgment (ACK) from a server, the terminal device exponentially increases a value of the CW.

In TCP communication, a terminal device can only transmit data, the amount of which is dependent on a CW, until the terminal device receives an ACK. A round trip time (RTT) thus largely affects throughput.

An OLT (optical transmission device) allocates communication resources (a band) for an ONU on the basis of a buffer amount notification transmitted by the ONU. For this reason, the terminal device may suffer an increase in delay and a reduction in throughput, depending on a band allocated by the OLT and a time period taken for the OLT to allocate the band.

An object of the present invention is to provide an optical transmission device, an optical communication system, and an optical communication method capable of enhancing throughput of a terminal device even when the terminal device establishes connection with a server to perform communication.

Means for Solving the Problem

An optical transmission device according to one aspect of the present invention is an optical transmission device which performs relaying between a terminal device and a server via an optical network device, the terminal device and the server establishing connection with each other, including a request detection unit which detects a connection establishment request transmitted to the server by the optical network device on the basis of a connection establishment request transmitted to the server by the terminal device, a response detection unit which detects an acknowledgment transmitted to the terminal device by the server on the basis of the connection establishment request detected by the request detection unit, and a band allocation unit which, if the response detection unit detects the acknowledgement, performs allocation so as to expand a band over which the optical network device is capable of transmission to the optical transmission device, regardless of presence or absence of a buffer amount notification from the optical network device.

An optical communication system according to one aspect of the present invention is an optical communication system including a server and an optical transmission device which performs relaying between a terminal device and the server via an optical network device, the terminal device and the server establishing connection with each other, wherein the optical transmission device includes a request detection unit which detects a connection establishment request transmitted to the server by the optical network device on the basis of a connection establishment request transmitted to the server by the terminal device, a response detection unit which detects an acknowledgment transmitted to the terminal device by the server on the basis of the connection establishment request detected by the request detection unit, and a band allocation unit which, if the response detection unit detects the acknowledgement, performs allocation so as to expand a band over which the optical network device is capable of transmission to the optical transmission device, regardless of presence or absence of a buffer amount notification from the optical network device.

An optical communication method according to one aspect of the present invention is an optical communication method for performing relaying between a terminal device and a server via an optical network device, the terminal device and the server establishing connection with each other, including a request detection step of detecting a connection establishment request transmitted to the server by the optical network device on the basis of a connection establishment request transmitted to the server by the terminal device, a response detection step of detecting an acknowledgment transmitted to the terminal device by the server on the basis of the detected connection establishment request, and a band allocation step of, if the acknowledgement is detected, performing allocation so as to expand a band over which the optical network device is capable of transmission to the optical transmission device, regardless of presence or absence of a buffer amount notification from the optical network device.

Effects of the Invention

According to the present invention, it is possible to enhance throughput of a terminal device even when the terminal device establishes connection with a server to perform communication.

DESCRIPTION OF EMBODIMENTS

Figure 1:
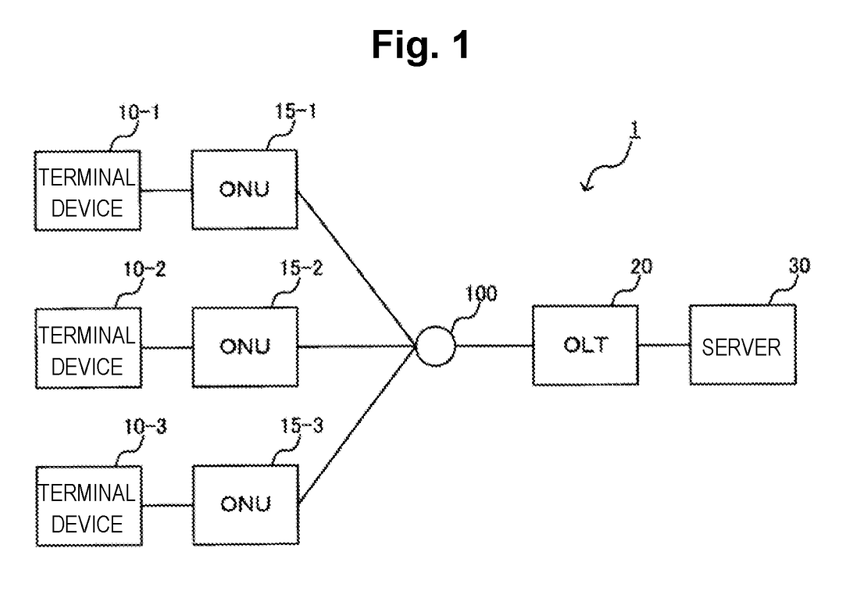
FIG. 1 is a diagram showing an example of a configuration of an optical communication system.

A background against which the present invention has been made will be described first. FIG. 1 is a diagram showing an example of a configuration of an optical communication system 1. As shown in FIG. 1, the optical communication system 1 has, for example, three terminal devices 10-1 to 10-3, ONUs 15-1 to 15-3, a splitter 100, an OLT 20, and a server 30. Note that the number of units of each type among units constituting the optical communication system 1 is not limited.

The terminal devices 10-1 to 10-3 are each, for example, a PC (personal computer), and establish, for example, TCP connection with the server 30 via the ONUs 15-1 to 15-3, the splitter 100, and the OLT 20 and performs communication.

For example, the terminal devices 10-1 to 10-3 each include, in an uplink signal, buffer information indicating a capacity of a transmit-receive buffer which the terminal device includes and transmit the respective uplink signals to the ONUs 15-1 to 15-3. If any of a plurality of components, such as the terminal devices 10-1 to 10-3, is not specified, each terminal device will simply be referred to as a terminal device 10 or the like hereinafter.

The ONUs 15-1 to 15-3 are terminating devices (optical network devices) on a user side which are arranged near the terminal devices 10-1 to 10-3, respectively, and are connected to the one OLT 20 via an optical fiber and the splitter 100. An ONU 15 also transmits a band request requesting a communication resource amount (band) to the OLT 20 on the basis of buffer information included in an uplink signal which is transmitted from the terminal device 10.

The ONUs 15-1 to 15-3 each convert an optical signal which is transmitted by the OLT 20 into an electrical signal and output the respective electrical signals to the terminal devices 10-1 to 10-3. The ONUs 15-1 to 15-3 convert respective electrical signals which are transmitted by the terminal devices 10-1 to 10-3 into optical signals and output the optical signals to the OLT 20.

The splitter 100 is an optical splitter which performs multiplexing and demultiplexing of optical signals which are transmitted between the ONUs 15-1 to 15-3 and the OLT 20 through the optical fiber.

The OLT 20 is an optical transmission device which is connected to the server 30 via a wired or wireless network and performs optical communication with each of the terminal devices 10-1 to 10-3. For example, the OLT 20 is a terminating device on a telecommunications carrier side.

The OLT 20 transfers, as a predetermined signal, optical signals which are transmitted by the ONUs 15-1 to 15-3 to the server 30 and transfers a signal which is output by the server 30 to each of the ONUs 15-1 to 15-3.

The server 30 is, for example, a content server. Note that the server 30 only needs to be a device which establishes connection with the terminal device 10 and performs communication and may be, for example, a PC (personal computer).

Figure 2:
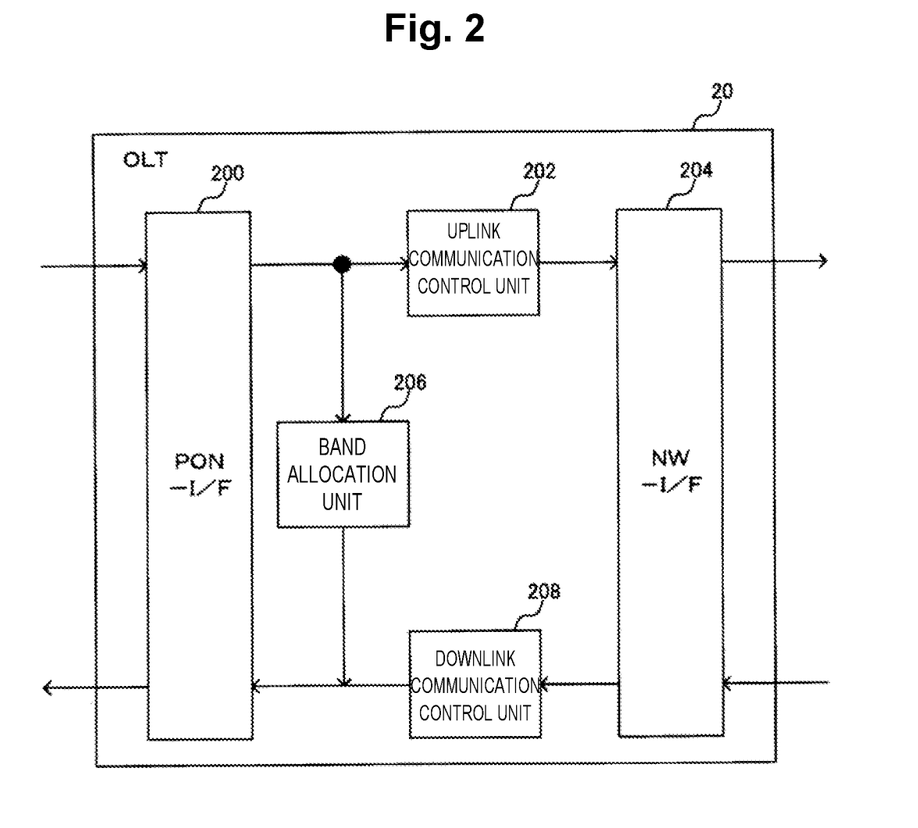
FIG. 2 is a functional block diagram showing an outline of functions which an OLT has.

FIG. 2 is a functional block diagram showing an outline of functions which the OLT 20 has. As shown in FIG. 2, the OLT 20 has, for example, a PON-I/F (I/F: interface) 200, an uplink communication control unit 202, a NW-I/F (NW: network) 204, a band allocation unit 206, and a downlink communication control unit 208.

The PON-I/F 200 has a function as an optical communication unit which performs optical communication with the ONUs 15-1 to 15-3 and switches between uplink communication and downlink communication with the ONUs 15-1 to 15-3 (the terminal devices 10-1 to 10-3). For example, the PON-I/F 200 receives uplink signals which are transmitted by the ONUs 15-1 to 15-3 and outputs the uplink signals to the uplink communication control unit 202 and the band allocation unit 206. The PON-I/F 200 also transmits a downlink signal which is processed by the downlink communication control unit 208 and bands (band amounts) which are allocated by the band allocation unit 206 to the ONUs 15-1 to 15-3 (the terminal devices 10-1 to 10-3).

The uplink communication control unit 202 buffers an uplink signal which is input from the PON-I/F 200, restores a PON frame to an original frame, and outputs the frame to the NW-I/F 204.

The NW-I/F 204 has a function as a network interface for transmission and reception of signals to and from the server 30 located upstream of the OLT 20. That is, the NW-I/F 204 transmits an uplink signal which is input from the uplink communication control unit 202 to the server 30 and outputs a downlink signal which is received from the server 30 to the downlink communication control unit 208.

The band allocation unit 206 allocates respective uplink communication resource amounts (bands) for the ONUs 15-1 to 15-3 on the basis of band requests (pieces of buffer information) included in an uplink signal which is input from the PON-I/F 200 and outputs pieces of band information indicating the allocated bands to the PON-I/F 200.

The downlink communication control unit 208 buffers a downlink signal which is input from the NW-I/F 204, converts the downlink signal into a PON frame, and outputs the PON frame to the PON-I/F 200.

Figure 3:
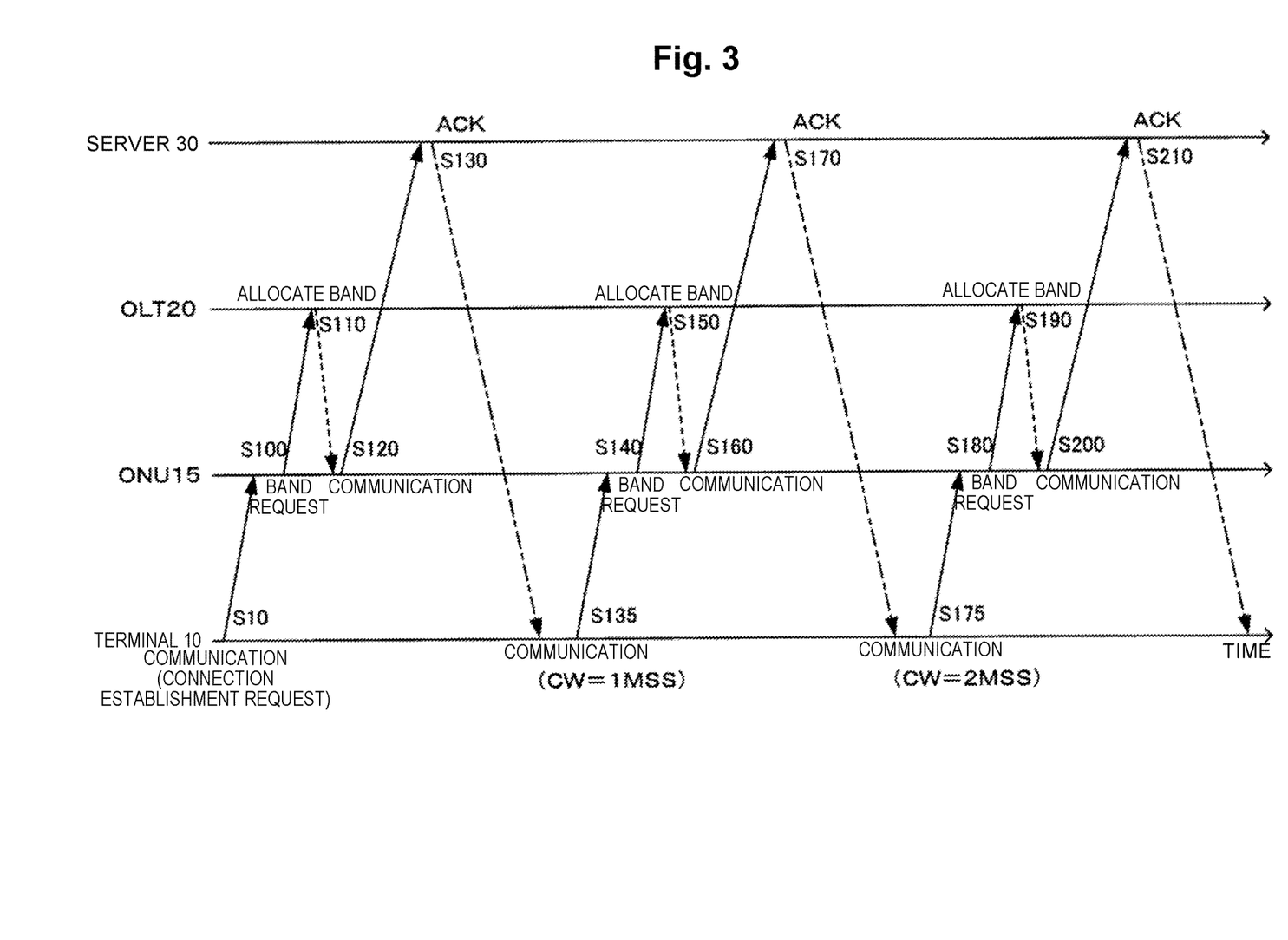
FIG. 3 is a sequence chart showing an example of operation of an optical communication system including the OLT.

FIG. 3 is a sequence chart showing an example of operation of the optical communication system 1 including the OLT 20. As shown in FIG. 3, the terminal device 10 first makes a connection establishment request (SYN packet) to the ONU 15 in order to request establishment of connection with the server 30 (S10).

In response to the connection establishment request from the terminal device 10, the ONU 15 transmits a band request to the OLT 20 (S100).

The OLT 20 makes a response of intent to allocate a band for connection to the ONU 15 (S110).

The ONU 15 transmits a SYN packet for establishing TCP connection using a band which is allocated by the OLT 20 to the server 30 via the OLT 20 (S120).

The server 30 transmits a response (ACK) to the SYN packet transmitted from the ONU 15 to the terminal device 10 via the OLT 20 and the ONU 15 (S130).

Note that a time period from when the terminal device 10 transmits a SYN packet to the server 30 to when the terminal device 10 receives a response (ACK) from the server 30 is a round trip time (RTT).

The terminal device 10 sets a congestion window (CW) to 1 MSS (Maximum Segment Size) and transmits data to the ONU 15 (S135). Although the ONU 15 receives the data to be transmitted at this time, no band has yet been allocated. For this reason, the ONU 15 temporarily stores the data in a buffer and makes a band request (buffer amount notification) based on an amount by which the buffer is occupied to the OLT 20.

Note that the congestion window (CW) is a value which is passed in a connection establishment request and a response thereto and is expressed as n×MSS. As to an initial value for the congestion window (CW), although n is set at 1 in FIG. 3, n is defined as 4 in RFC 2581, and n is defined as 10 in RFC 6928.

The OLT 20 requests a band for connection from the OLT 20 on the basis of the band request from the ONU 15 (S140).

The OLT 20 makes a response of intent to allocate a band for connection to the ONU 15 (S150).

The ONU 15 transmits the data with the CW of 1 MSS stored in the buffer to the server 30 via the OLT 20 (S160).

The server 30 transmits a response (ACK) to the data transmitted with the CW of 1 MSS from the ONU 15 to the terminal device 10 via the OLT 20 and the ONU 15 (S170).

The terminal device 10 then sets the CW to 2 MSS and transmits data to the ONU 15 (S175).

The ONU 15 requests, to the OLT 20, a band after reception of the data from the terminal device 10 (S180).

The OLT 20 makes a response of intent to allocate a band to the ONU 15 (S190).

The ONU 15 transmits the data with the CW of 2 MSS stored in the buffer to the server 30 via the OLT 20 (S200).

The server 30 transmits a response (ACK) to the data transmitted with the CW of 2 MSS from the ONU 15 to the terminal device 10 via the OLT 20 and the ONU 15 (S210).

Figure 4:
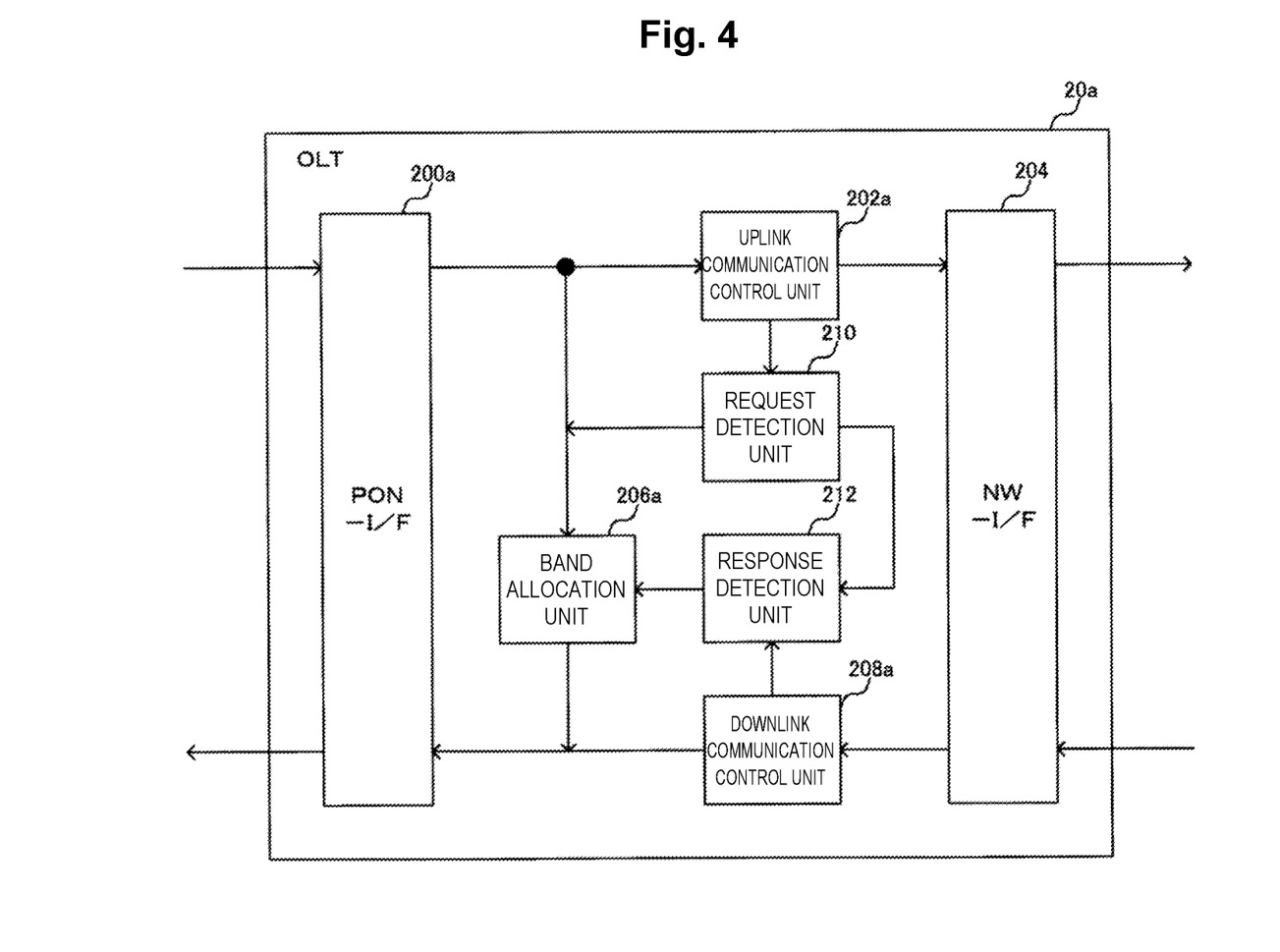
FIG. 4 is a functional block diagram showing an outline of functions which an OLT according to one embodiment has.

Next, an OLT 20*a* according to one embodiment will be described. FIG. 4 is a functional block diagram showing an outline of functions which the OLT 20*a* according to the one embodiment has. The OLT 20*a* is replaced by the OLT 20 shown in FIG. 1 to constitute an optical communication system 1. The OLT 20*a* performs relaying between a terminal device 10 and a server 30 which establish connection with each other by TCP.

As shown in FIG. 4, the OLT 20*a* has a PON-I/F 200*a*, an uplink communication control unit 202*a*, a request detection unit 210, a NW-I/F 204, a response detection unit 212, a band allocation unit 206*a*, and a downlink communication control unit 208*a*.

The PON-I/F 200*a* has a function as an optical communication unit which performs optical communication with ONUS 15-1 to 15-3 and switches between uplink communication and downlink communication with the ONUS 15-1 to 15-3 (the terminal devices 10-1 to 10-3). For example, the PON-I/F 200*a* receives uplink signals which are transmitted by the ONUS 15-1 to 15-3 and outputs the uplink signals to the uplink communication control unit 202*a* and the band allocation unit 206*a*. The PON-I/F 200*a* also transmits a downlink signal which is processed by the downlink communication control unit 208*a* and bands (band amounts) which are allocated by the band allocation unit 206*a* to the ONUS 15-1 to 15-3 (the terminal devices 10-1 to 10-3).

The uplink communication control unit 202*a* buffers an uplink signal which is input from the PON-I/F 200*a*, restores a PON frame to an original frame, and outputs the frame to the NW-I/F 204*a* and the request detection unit 210.

The request detection unit 210 detects a connection establishment request which is transmitted to the server 30 by the ONU 15 on the basis of, for example, a processed uplink signal which is input from the uplink communication control unit 202*a* and outputs information indicating the transmission of the connection establishment request to the server 30 by the ONU 15 and a destination address to the band allocation unit 206*a* and the response detection unit 212.

For example, the request detection unit 210 detects a SYN packet for establishing TCP connection which is transmitted to the server 30 by the ONU 15 and outputs information indicating the detection and a communication partner (transmission information and a destination address) to the band allocation unit 206*a* and the response detection unit 212.

That is, the request detection unit 210 detects a connection establishment request which is transmitted to the server 30 by the ONU 15 on the basis of a connection establishment request which is transmitted to the server 30 by the terminal device 10.

The NW-I/F 204 has a function as a network interface for transmission and reception of signals to and from the server 30 located upstream of the OLT 20. That is, the NW-I/F 204 transmits an uplink signal which is input from the uplink communication control unit 202 to the server 30 and outputs a downlink signal which is received from the server 30 to the downlink communication control unit 208.

The downlink communication control unit 208*a* buffers a downlink signal which is input from the NW-I/F 204, converts the downlink signal into a PON frame, and outputs the PON frame to the response detection unit 212 and the PON-I/F 200*a*.

The response detection unit 212 detects an acknowledgment (ACK) which is transmitted to the terminal device 10 by the server 30 on the basis of, for example, information which is input from the request detection unit 210 and a downlink signal processed by the downlink communication control unit 208*a*. The response detection unit 212 outputs information indicating the transmission of the acknowledgment (ACK) to the terminal device 10 by the server 30, a predetermined instruction (to be described later), and the like to the band allocation unit 206*a*.

That is, the response detection unit 212 detects an acknowledgement which is transmitted to the terminal device 10 by the server 30 on the basis of a connection establishment request which is detected by the request detection unit 210.

Note that, after information is input from the request detection unit 210, the response detection unit 212 waits for a fixed time period for an acknowledgement (ACK) which is a communication opposite in transmission information and destination address to an uplink signal. The fixed time period is set to a length equal to or more than a time period (a retransmission time-out time period) taken for a transmitting side (the terminal device 10) to retransmit data.

For example, if the response detection unit 212 detects an acknowledgement (ACK) within the fixed time period, since a CW is expected to be increased in later TCP communication, the response detection unit 212 instructs the band allocation unit 206a to allocate a band wider than last time.

The band allocation unit 206a allocates respective communication resource amounts (bands) for the ONUs 15 (the terminal devices 10) on the basis of information which is input from the PON-I/F 200a, information which is input from the request detection unit 210, information which is input from the response detection unit 212, and the like and outputs pieces of band information indicating the allocated bands to the PON-I/F 200a.

For example, if the response detection unit 212 detects an acknowledgment (ACK), the band allocation unit 206a performs allocation so as to expand a band over which the terminal device 10 is capable of transmission to the server 30, regardless of presence or absence of a buffer amount notification from the ONU 15 (the terminal device 10).

In the presence of a buffer amount notification from the ONU 15 (the terminal device 10), the band allocation unit 206a may allocate a band over which the terminal device 10 is capable of transmission to the server 30, regardless of the magnitude of a buffer amount in question. That is, the band allocation unit 206a may be configured to ignore a buffer amount in question if the ONU 15 transmits a buffer amount notification.

In normal TCP communication, a congestion window (CW) increases exponentially. In contrast, the band allocation unit 206a performs band allocation, for example, on the assumption that a congestion window (CW) is twice wider than last time. Note that a band to be allocated by the band allocation unit 206a is not limited to an amount twice a width of a most recently allocated band if the response detection unit 212 detects an acknowledgment.

For example, the band allocation unit 206a may allocate a band on the assumption that the congestion window (CW) increases to a maximum value for a standard. Alternatively, the band allocation unit 206a may perform band allocation for the congestion window (CW) having an initial value after a SYN packet for establishing TCP connection is detected, and a first ACK packet is received.

The band allocation unit 206a may determine the initial value on the basis of the fact that n=4 in RFC 2581, the fact that n=10 in RFC 6928, or the like. Alternatively, the band allocation unit 206a may monitor uplink traffic thus far, learn how wide a band is needed as an initial value, and allocate a band. For example, if the response detection unit 212 detects an acknowledgment, the band allocation unit 206a may perform allocation so as to expand a band on the basis of statistics obtained by learning traffic amounts after past acknowledgment detection by the response detection unit 212.

Figure 5:
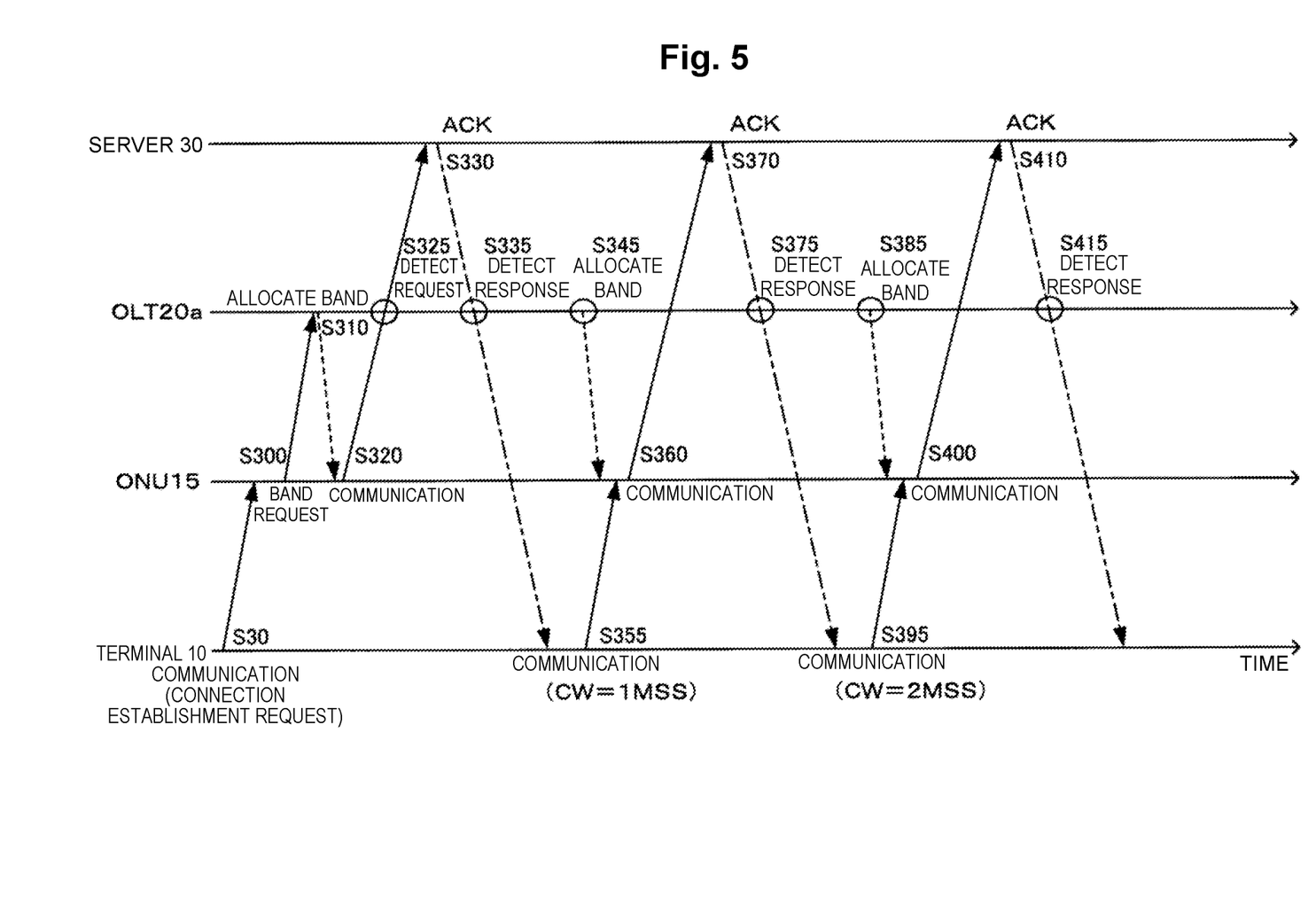
FIG. 5 is a sequence chart showing an example of operation of an optical communication system including the OLT according to the one embodiment.

An example of operation of the optical communication system 1 including the OLT 20a will be described. FIG. 5 is a sequence chart showing the example of the operation of the optical communication system 1 including the OLT 20a according to the one embodiment. As shown in FIG. 5, the terminal device 10 first transmits a connection establishment request (SYN packet) to the ONU 15 in order to request establishment of connection with the server 30 (S30).

The ONU 15 transmits a band request to the OLT 20 after reception of the connection establishment request from the terminal device 10 (S300).

The OLT 20 makes a response of intent to allocate a band to the ONU 15 (S310).

The ONU 15 transmits a SYN packet for establishing TCP connection using a band which is allocated by the OLT 20 to the server 30 via the OLT 20 (S320).

At this time, in the OLT 20a, the request detection unit 210 detects a connection establishment request which is transmitted to the server 30 by the ONU 15 (S325).

The server 30 transmits a response (ACK) to the SYN packet transmitted from the ONU 15 to the terminal device 10 via the OLT 20 and the ONU 15 (S330).

At this time, in the OLT 20a, the response detection unit 212 detects the acknowledgment (ACK) transmitted to the terminal device 10 by the server 30 on the basis of the connection establishment request detected by the request detection unit 210 (S335).

Note that a time period from when the terminal device 10 transmits a SYN packet to the server 30 to when the terminal device 10 receives a response (ACK) from the server 30 is a round trip time (RTT).

If the response detection unit 212 detects the acknowledgment (ACK), the OLT 20a performs allocation so as to expand a band over which the ONU 15 is capable of transmission to the OLT 20a, regardless of presence or absence of a buffer amount notification from the ONU 15 (the terminal device 10) (S345).

Even without the ONU 15 requesting band allocation by the OLT 20a, the OLT 20a expands and allocates the band in the process in S345. Thus, once the ONU 15 receives data which is transmitted with the CW of, for example, 1 MSS from the terminal device 10 to the server 30 (S355), the ONU 15 transmits the received data to the server 30 via the OLT 20 (S360).

Here, a time period taken for the ONU 15 to request band allocation by the OLT 20a and a later time period taken for the OLT 20a to allocate a band are unnecessary.

The server 30 transmits a response (ACK) to the data transmitted with the CW of 1 MSS from the ONU 15 to the terminal device 10 via the OLT 20 and the ONU 15 (S370).

At this time, in the OLT 20a, the response detection unit 212 detects the acknowledgment (ACK) transmitted to the terminal device 10 by the server 30 (S375).

If the response detection unit 212 detects the acknowledgment (ACK), the OLT 20a performs allocation so as to expand the band, over which the ONU 15 is capable of transmission to the OLT 20a, regardless of presence or absence of a buffer amount notification from the ONU 15 (the terminal device 10) (S385).

Even without the ONU 15 requesting band allocation by the OLT 20a, the OLT 20a expands and allocates the band in the process in S385. For this reason, once the ONU 15 receives data which is transmitted with the CW of, for example, 2 MSS from the terminal device 10 to the server 30 (S395), the ONU 15 transmits the received data to the server 30 via the OLT 20 (S400).

Here, a time period taken for the ONU 15 to request band allocation by the OLT 20a and a time period taken for the OLT 20a to allocate a band to the ONU 15 are unnecessary.

The server 30 transmits a response (ACK) to the data transmitted with the CW of 2 MSS from the ONU 15 to the terminal device 10 via the OLT 20 and the ONU 15 (S410).

At this time, in the OLT 20a, the response detection unit 212 detects the acknowledgment (ACK) transmitted to the terminal device 10 by the server 30 (S415) and continues predetermined communication.

As described above, if the OLT 20a detects a connection establishment request which is transmitted by the ONU 15

(the terminal device 10) and detects an acknowledgment which is transmitted by the server 30, the OLT 20a performs allocation so as to expand a band over which the terminal device 10 is capable of transmission, regardless of presence or absence of a buffer amount notification to be transmitted by the ONU 15 (the terminal device 10). For this reason, the OLT 20a can reduce a time period required for band allocation and enhance throughput of the terminal device 10.

Note that a part or the whole of each of functions of the terminal device 10, the ONU 15, the OLT 20, the OLT 20a, and the server 30 may be implemented by hardware or may be implemented as a program to be executed by a processor, such as a CPU.

That is, the optical communication system 1 according to the present invention can be implemented by using a computer and a program, and the program can be recorded on a storage medium or can be provided through a network.

Figure 6:
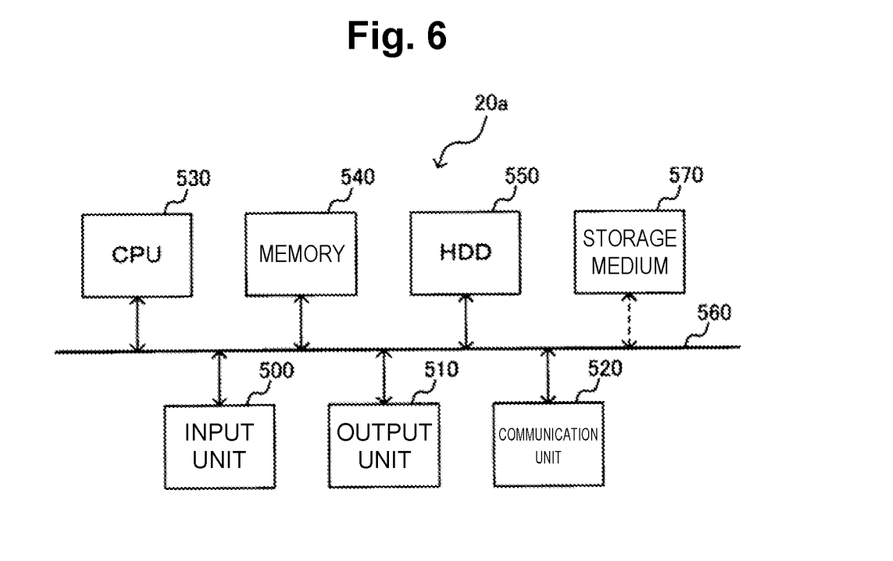
FIG. 6 is a diagram showing an example of a hardware configuration of the OLT according to the one embodiment.

FIG. 6 is a diagram showing an example of a hardware configuration of the OLT 20a according to the one embodiment. As shown in FIG. 6, for example, an input unit 500, an output unit 510, a communication unit 520, a CPU 530, a memory 540, and an HDD 550 are connected via a bus 560, and the OLT 20a has functions as a computer. The OLT 20a is configured to be capable of inputting and outputting data from and to a storage medium 570.

The input unit 500 is, for example, a keyboard or a mouse. The output unit 510 is a display device, such as a display. The communication unit 520 is, for example, a wireless or wired network interface.

The CPU 530 controls the units constituting the OLT 20a and performs the above-described processing. The memory 540 and the HDD 550 store data. The storage medium 570 is configured to be capable of storing, e.g., an optical communication program which causes execution of the functions that the OLT 20a has. Note that architecture of the OLT 20a is not limited to the example shown in FIG. 6. The terminal device 10, the ONU 15, the OLT 20, and the server 30 may have the same configurations as the OLT 20a.

REFERENCE SIGNS LIST

1 Optical communication system
10-1 to 10-3 Terminal device
15-1 to 15-3 ONU
20, 20a OLT
30 Server
100 Splitter
200, 200a PON-I/F
202, 202a Uplink communication control unit
204 NW-I/F
206, 206a Band allocation unit
208, 208a Downlink communication control unit
210 Request detection unit
212 Response detection unit
500 Input unit
510 Output unit
520 Communication unit
530 CPU
540 Memory
550 HDD
560 Bus
570 Storage medium

The invention claimed is:

1. An optical line terminal (OLT) which performs relaying between a terminal device and a server via an optical network device, the terminal device and the server establishing connection with each other, the OLT comprising:
at least one transmitter;
at least one receiver;
a processor; and
a storage medium having computer program instructions stored thereon, which when executed by the processor, cause the processor to:
detect a connection establishment request transmitted to the server by the optical network device in response to a connection establishment request being transmitted to the server by the terminal device;
detect an acknowledgment transmitted to the terminal device by the server in response to detection of the connection establishment request; and
in response to detection of an acknowledgment, perform allocation thereby expanding a band over which the terminal device is capable of transmission to the server, regardless of presence or absence of receiving a buffer amount notification from the terminal device.

2. The OLT according to claim 1, wherein the computer program instructions further cause the processor to
detect a TCP-based connection establishment request transmitted to the server by the terminal device.

3. The OLT according to claim 1, wherein the computer program instructions further cause the processor to allocate a band twice a width of a most recently allocated band in response to the detection of the acknowledgment.

4. The OLT according to claim 1, wherein the computer program instructions further cause the processor to perform the allocation so as to expand the band based on statistics obtained by learning a traffic amount after past detection of the acknowledgment by the response detection unit in response to detection of the acknowledgment.

5. An optical communication system comprising a server and an optical line terminal (OLT) which performs relaying between a terminal device and the server via an optical network device, the terminal device and the server establishing connection with each other,
wherein the OLT comprises:
at least one transmitter;
at least one receiver;
a processor; and
a storage medium having computer program instructions stored thereon, which when executed by the processor, cause the processor to:
detect a connection establishment request transmitted to the server by the optical network device in response to a connection establishment request being transmitted to the server by the terminal device,
detect an acknowledgment transmitted to the terminal device by the server in response to the detection of the connection establishment request, and
in response to detecting the acknowledgment, performing allocation thereby expanding a band over which the terminal device is capable of transmission to the server, regardless of presence or absence of receiving a buffer amount notification from the terminal device.

6. The optical communication system according to claim 5, wherein the computer program instructions further cause the processor to
detect a TCP-based connection establishment request transmitted to the server by the terminal device.

7. An optical communication method for performing relaying between a terminal device and a server via an optical network device, the terminal device and the server establishing connection with each other, comprising:
a request detection step of detecting a connection establishment request transmitted to the server by the optical network device based on a connection establishment request transmitted to the server by the terminal device;

a response detection step of detecting an acknowledgment transmitted to the terminal device by the server in response to detection of the connection establishment request; and a band allocation step of, in response to the detection of the acknowledgment, performing allocation thereby expanding a band over which the terminal device is capable of transmission to the server, regardless of presence or absence of receiving a buffer amount notification from the terminal device.

8. The optical transmission method according to claim 7, wherein the request detection step comprises detecting a TCP-based connection establishment request transmitted to the server by the terminal device.

\* \* \* \* \*